United States Patent
Gong et al.

(10) Patent No.: US 6,489,978 B1
(45) Date of Patent: Dec. 3, 2002

(54) EXTENDING THE OPENING TIME OF STATE MENU ITEMS FOR CONFORMATIONS OF MULTIPLE CHANGES

(75) Inventors: Qing Gong, Boynton Beach, FL (US); Huifang Wang, Boynton Beach, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/370,127

(22) Filed: Aug. 6, 1999

(51) Int. Cl.[7] .................................................. G09G 5/00
(52) U.S. Cl. ........................................ 345/845; 345/814
(58) Field of Search ........................ 345/764, 809–823, 345/829, 845

(56) References Cited

U.S. PATENT DOCUMENTS 6,208,340 B1 * 3/2001 Amin et al. ................ 345/764

* cited by examiner

Primary Examiner—Raymond J. Bayerl
Assistant Examiner—Tadesse Hailu
(74) Attorney, Agent, or Firm—Steven J. Meyers; David M. Shofi; Fleit, Kain, Gibbons, Gutman & Bongini P.L.

(57) ABSTRACT

A method, information processing system and computer readable storage medium for presenting a graphical menu item on a display. The graphical menu is displayed by receiving a time delay selected by an end-user; presenting to the end-user a graphical menu item wherein at least one menu item has a selectable option state; receiving input from the end-user for changing the option state on at least one menu item; and waiting an amount of time greater than the time delay before removing the graphical menu item from the display.

5 Claims, 5 Drawing Sheets

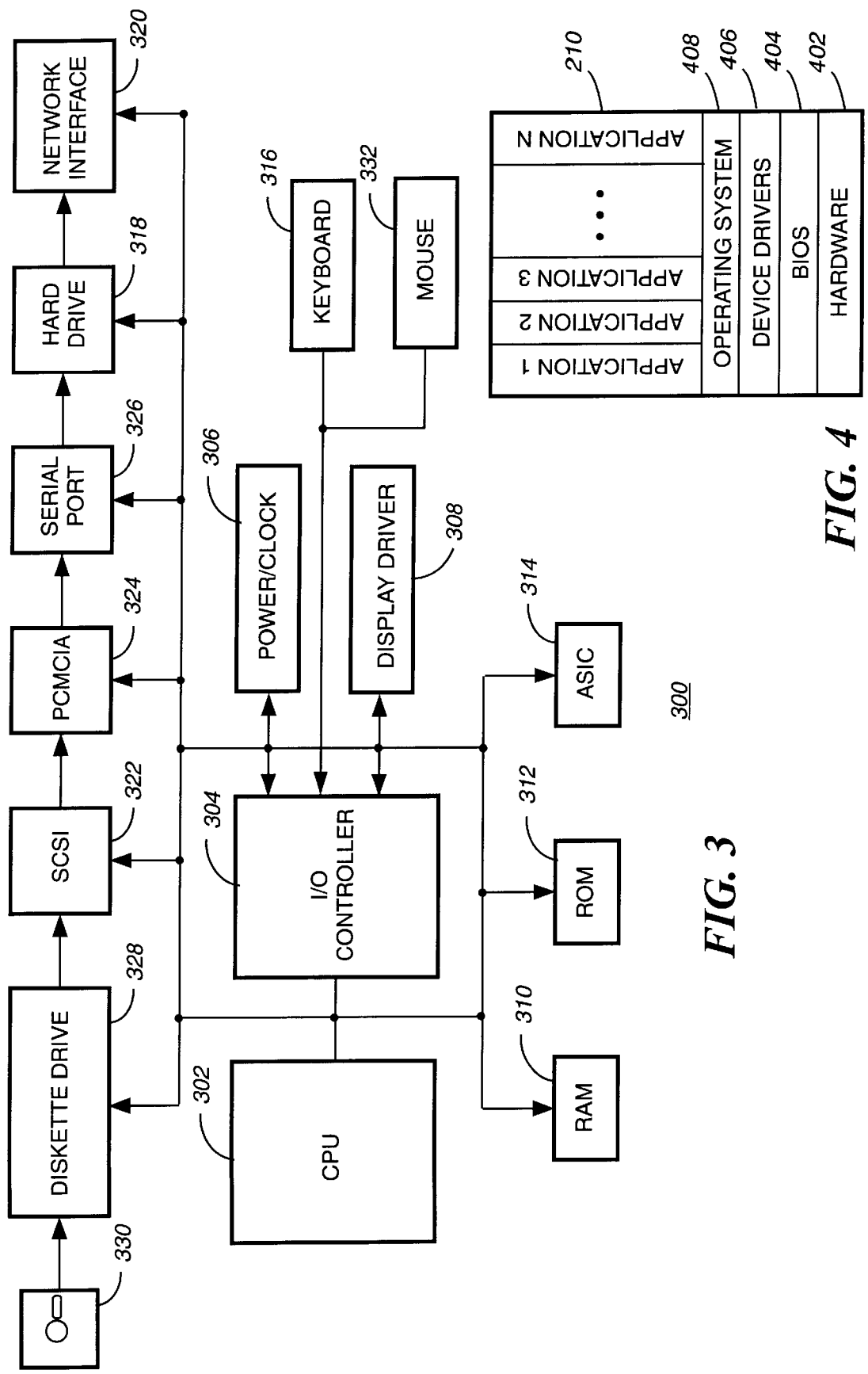

EXTENDING THE OPENING TIME OF STATE MENU ITEMS FOR CONFORMATIONS OF MULTIPLE CHANGES

CROSS-REFERENCE TO RELATED APPLICATIONS

Not applicable

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The invention disclosed broadly relates to the field of computers computing, and more particularly relates to the menu items in the field of graphical user interfaces.

2. Description of the Related Art

Graphical user interfaces have been improving for a long time. From the beginning of computer history, computer developers have been working on ways to improve the easy of use of the machine with end-user by building better user interfaces. One of the purposes of the graphical user interfaces (GUIs) were to make it easier to perform complicated tasks such a moving files and starting programs. The history of computer GUI goes back to a project by the Xerox Corporation in the 1970s to present information more easily to end-users. Soon Apple through its Macintosh and Lisa line of products, Microsoft through its Windows 3.1 and Windows 95 products, IBM through its OS/2 products and others began to offer even more sophisticated GUIs and improved on the innovations made by Xerox. Higher resolution displays, the introduction of color graphics, the use of animated objects, the use of photorealistic pictures and even the introduction of 3-D user interfaces have greatly improved the ease of use of the computer. of GUIs.

Although GUIs have continued to evolve and make tasks easier for end-users there are some tasks that are still very burdensome to complete. Referring to FIG. 1 is a screen capture of an application program 100 entitled "Paint" that ships with Windows 95 and other Microsoft products. Shown is a typical pull-down menu bar 102 with various menu items. One menu 108 item entitled "View" has an associated pull-down menu 104 with various end-user selectable options, such as the option 106 entitled "Color Box". The pull down menu 104 is activated by moving cursor 112 with a mouse (not shown) or other graphical pointing device. A check box 110 denoted by symbol "✓" notifies the end-user that this option 106 "Color Box" is currently selected. The instant the end-user selects this option 106 "Color Box" the pull-down menu 104 is programed to disappear from the application program 100 and the cursor changes to a pencil 202 as shown in FIG. 2. This action of changing the state of an option 106 from enabled to disabled is disruptive to the end-user. The end-user cannot discern that the action has been completed or what selection has been made because the box has disappeared. The end-user many times re-pulls opens the pull-down menu 104 to double check to determine if the option 106 state has been changed. The option state 106 in this example would change from the check box 110 denoted by symbol "✓" to an absence of a checked box 110. Of course, alternately for this particular example an end-user may notice that the corresponding graphic 114 for the option 106 "Color Box" has disappeared, as shown in FIG. 2. However, many times the end-user is a novice with an application program 100 and may not understand what items changed on the application screen. Moreover, many times application program 100 does not give any graphical feedback at all to an end-user of the state of an option 106 has changed. Accordingly, a need exists for a method to provide the end-user feedback that an option state has changed.

Still another burden with the changing of option states in menus, dialog boxes using radio buttons and other types of menu choices in which the menu closes immediately is the requirement of changing several options at once. Stated differently, if an end-user wishes to change more than one option in a pull-down menu 104, such as both option 106 "Color Box" and option 116 "Status Bar", the end-user must repeat the action of selecting pull-down menu bar 102 with various menu items. Each option 106 and 116 must be selected individually. This is unnecessarily burdensome. Accordingly, a need exists for a method to provide an end-user a method for selecting many option states on one menu item without having to reopen the menu.

Although the examples in FIGS. 1 and 2 have been limited to one example of application program 100 and one type of menu, i.e., pull-down menu 104, other menu types including radio buttons and check boxes, that disappear automatically after the end-user makes a selection suffer the same shortcomings as discussed above for the pull-down menu 104. Accordingly, a need exists to overcome the problems with changing states on application program options with these menu types as well.

SUMMARY OF THE INVENTION

Briefly, in accordance with the present invention, a method for presenting a graphical menu item on a display. The method comprising the steps of: receiving a time delay selected by an end-user; presenting to the end-user a graphical menu item wherein at least one menu item having an selectable option state; receiving input from the end-user for changing the option state on at least one menu item; and waiting an amount of time greater than the time delay before removing the graphical menu item from the display.

In accordance with another embodiment of the present invention, an information processing system and computer readable storage medium is disclosed for carrying out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 3 is a block diagram of the major electrical components of an information processing system according to the present invention.

FIG. 4 is a block diagram illustrating the software hierarchy for the information processing device of FIG. 3 according to the present invention.

DETAILED DESCRIPTION OF AN EMBODIMENT

Figure 1:
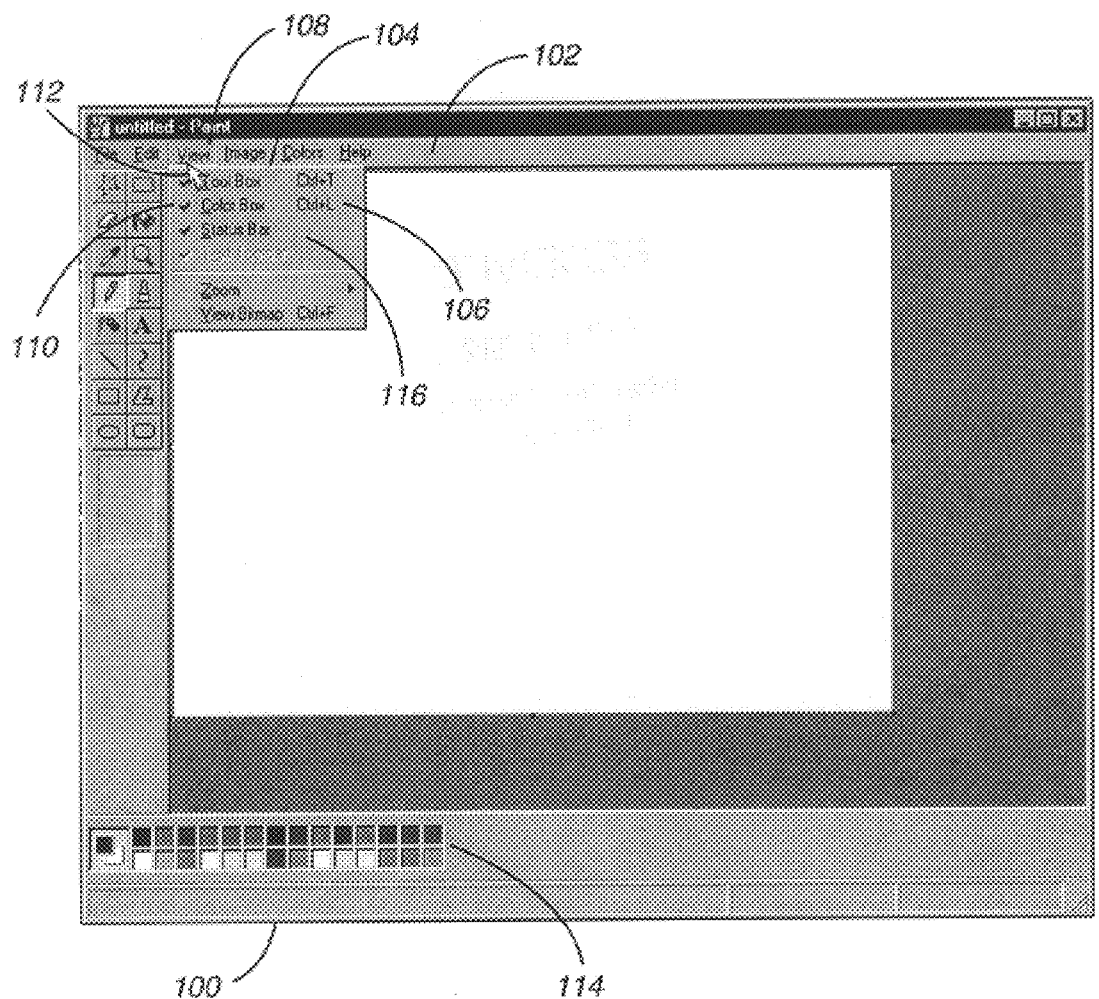
FIG. 1 is a screen capture of an application program entitled "Paint" of the prior art option state selection.
Figure 2:
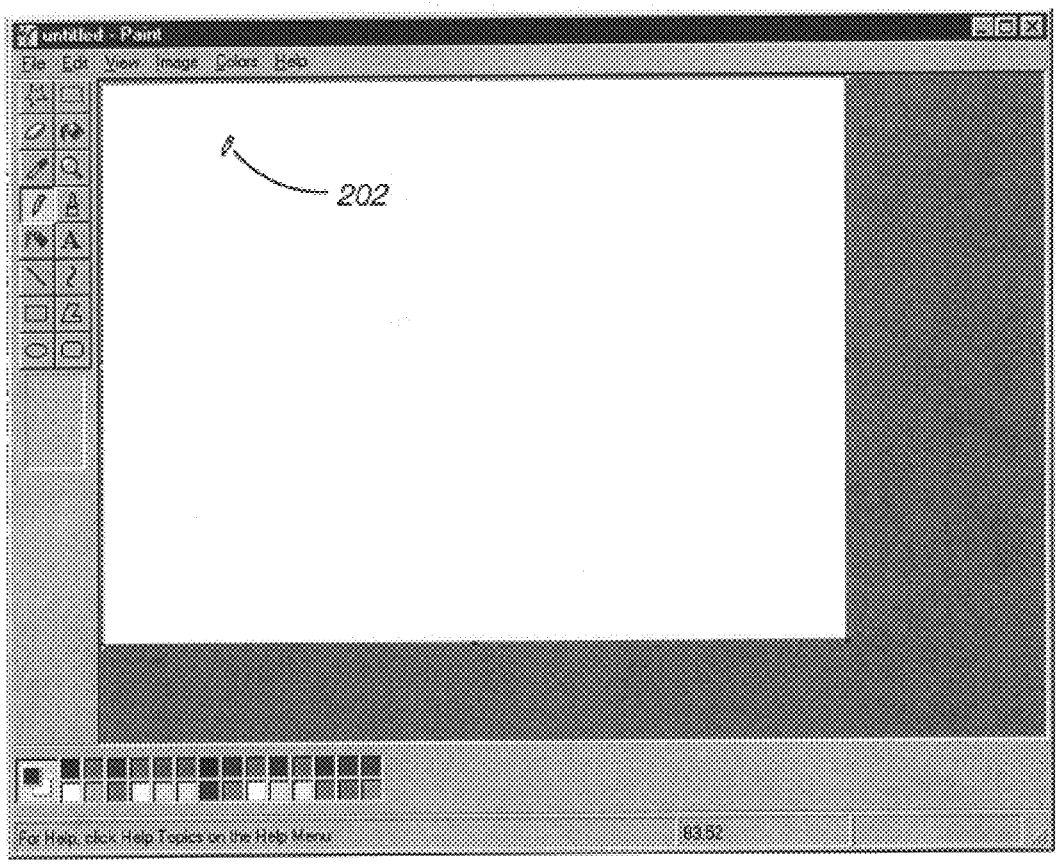
FIG. 2 is a screen capture of an application program of FIG. 1 after an option state has been selected.

An Embodiment of the Hardware and Software Systems

Referring now in more detail to the drawings in which like numerals refer to like parts throughout several views, FIG. 3, shows a block diagram of the major electrical components of a computer system 300 used in accordance with this invention. The electrical components include: a central processing unit (CPU) 302, an Input/Output (I/O) Controller 304, a system power and clock source 306; display driver 308; RAM 310; ROM 312; ASIC (application specific integrated circuit) 314 and a hard disk drive 318. A keyboard 316 with a mouse 332 receives the end-user input. These are representative components of a computer. The operation of a computer comprising these elements is well understood. Network interface 320 provides connection to a computer network such as Ethernet, TCP/IP or other popular protocol network interfaces. Optional components for interfacing to external peripherals include: a Small Computer Systems Interface (SCSI) port 322 for attaching peripherals; a PCM-CIA slot 324; and serial port 326. An optional diskette drive 328 is shown for loading or saving code to removable diskettes 330 or equivalent computer readable media such as CD-ROM, removable storage medium and optical character scanning. The system 300 may be implemented by combination of hardware and software. Moreover, the functionality required for using the invention may be embodied in computer-readable media (such as 3.5 inch diskette 330) to be used in programming an information-processing apparatus (e.g., a personal computer) to perform in accordance with the invention.

Figure 5:
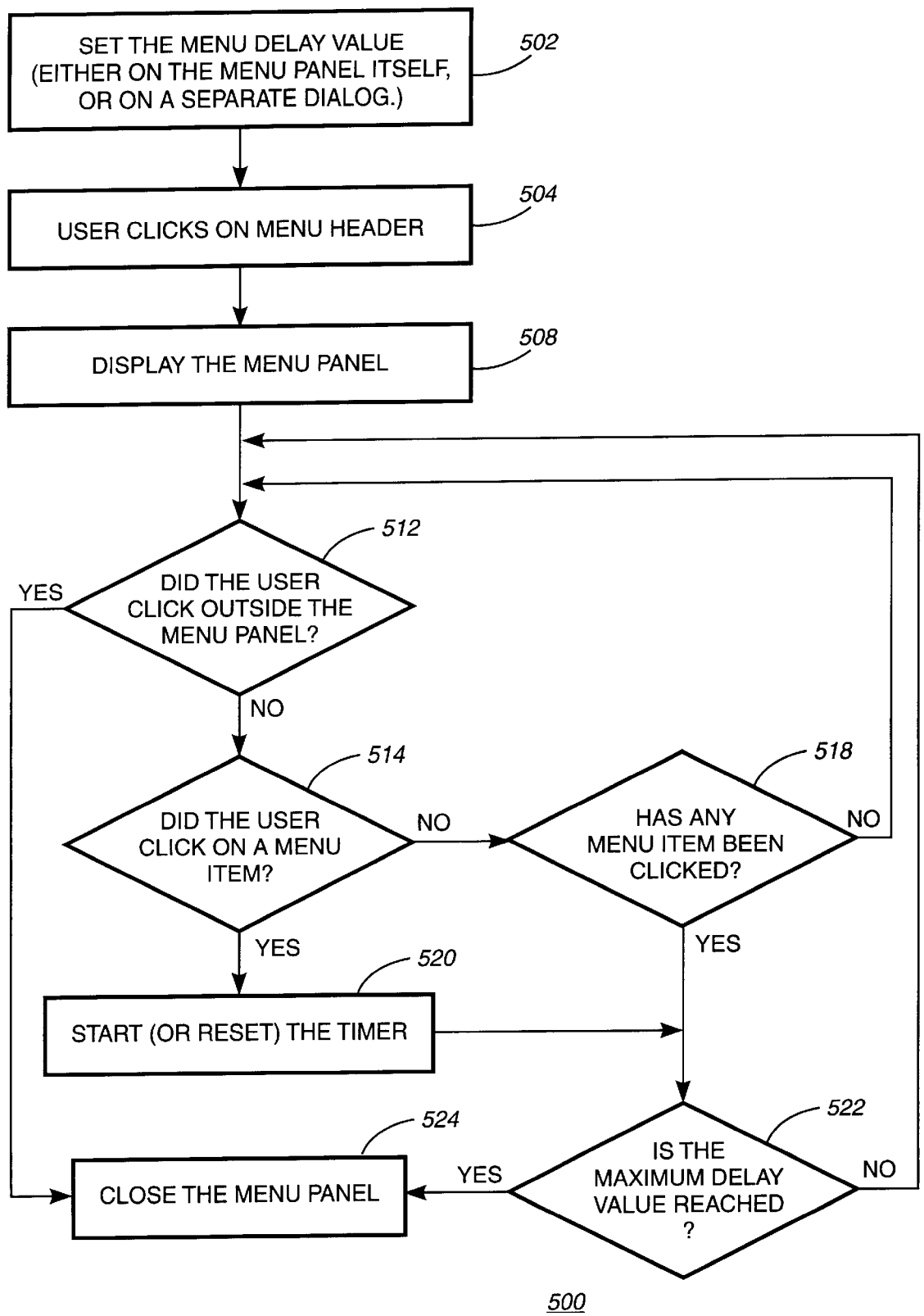
FIG. 5 is a flow diagram of the menu lag process flow according to the present invention.

FIG. 4 is a block diagram illustrating the software hierarchy for the information processing system of FIG. 3 according to the present invention. The hardware 402 is the information processing system of FIG. 3. BIOS (Basic Input Output System) 404 is a set of low level computer hardware instructions, usually stored in ROM 412, for communications between an operating system 408, device driver(s) 406 and hardware 402. Device drivers 406 are hardware specific code used to communicate between and operating system 408 and hardware peripherals such as a mouse 432, CD ROM drive or printer. Applications 410 are software applications written in C/C++, Java, assembler or equivalent. The functional block diagrams in FIGS. 4 and 5 are implemented as a software application 410 as described in greater detail below. Operating system 408 is the master program that loads after BIOS 404 initializes, that controls and runs the hardware 402. Examples of operating systems include DOS, Windows 3.1/95/98/NT, Unix, Macintosh, OS/2 and equivalent.

An Embodiment of the Process Flow

The words "option state" is used through this patent to describe an application software option that has one of a predetermined number of states, typically "on" or "off" and "enabled" or "disabled" and "selected" and "unselected" and other equivalents. Turning now to FIG. 5, there is shown a flow diagram of the menu lag process flow 500 according to the present invention. The application 100 in FIG. 1 is referenced for convenience. The process begins with an end-user selecting the value of the menu delay of T, steps 502. Next an end-user selects an application 100, and selects a pull-down menu bar 102, step 504. The pull-down menu 104 is display, step 508. At step 512, a test is made to determine if the end-user selected an area with a cursor outside the pull-down menu 104. If the end-user did select an area outside the pull-down menu 104, the pull-down menu 104 is closed, step 524. If the end-user did not desire to close the pull-down menu 104 by selecting an area outside the pull-down menu with a mouse, a test is made in step 514 to determine if the end-user changed an option state on the pull-down menu 104. If an option state is changed, a timer is loaded with time delay value of T, step 520. Next a test is made in step 522 to see if the delay set in the timer of T has expired. If the time expired, the pull-down menu 104 is closed in step 524.

In order to handle the case of multiple state options changing, two additional loops are present in this process flow 500. If the time delay set in the timer of T is not expired in step 522, the process repeats step 512 to see if the end-user manually closed the pull-down menu 104. If the end-user has not closed the pull-down menu, the determination in step 514 of whether a menu item been selected. If no menu item has been selected, a test, in step 518 is made to see if any of the state options in pull-down menu 104 have changed.

If any option has been changed, a test of the timer delay in step 522 is made. Otherwise, if a menu item had not been changed in step 518, the process loops back to step 512 to begin again. If the end-user does change another pull-down menu 104 or even toggles, the same previous selected menu item, the delay timer T is reset. This resettable delay timer T allows the end-user another chance to view items before the pull-down menu 104 is closed.

Figure 6:
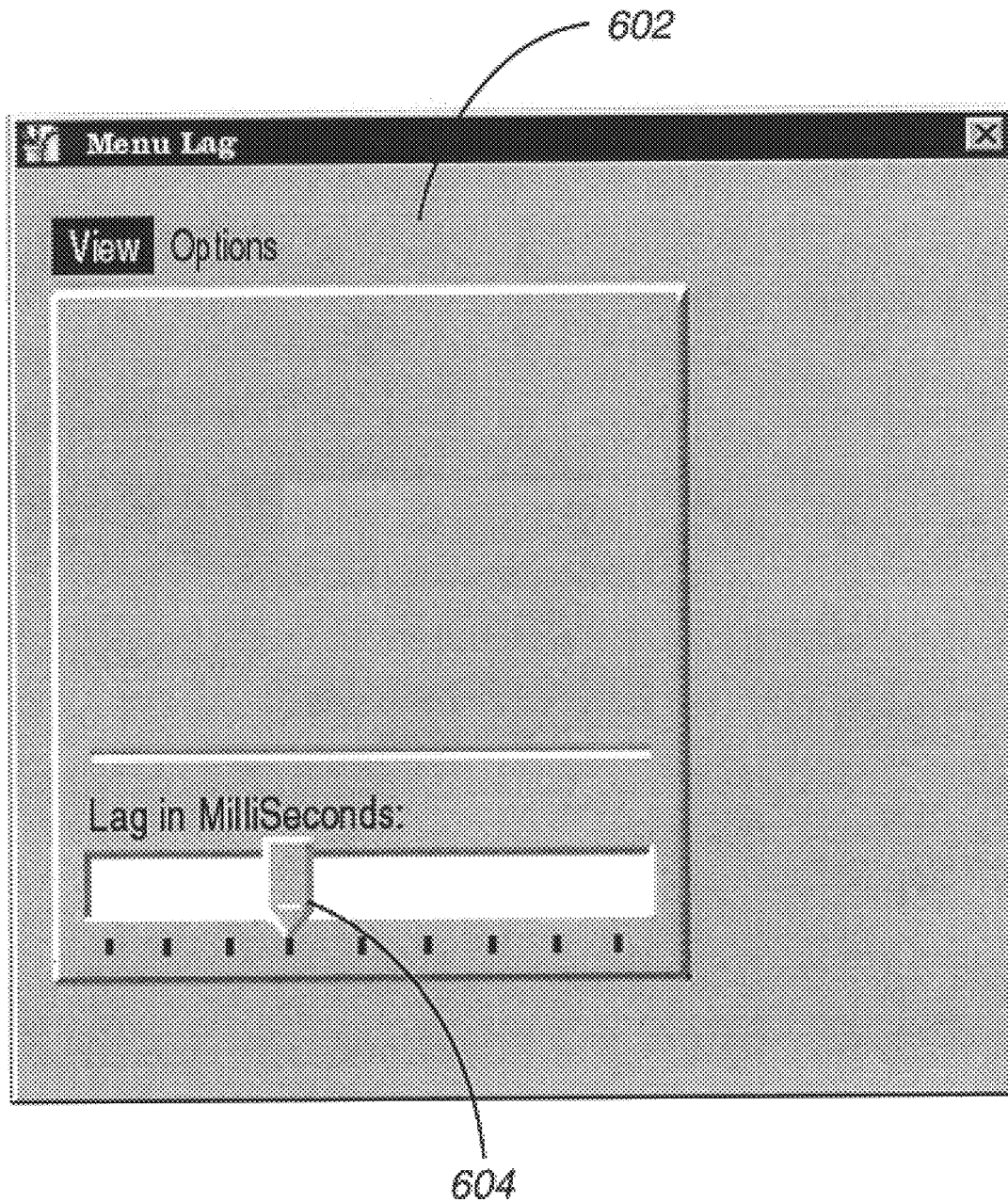
FIG. 6 is a screen capture of the options for the menu lag process flow of FIG. 5 according to the present invention.

FIG. 6 is a screen capture of the options for the menu lag process flow of FIG. 5 according to the present invention. The lag application window 602 in one embodiment, is a standalone window that sets the timer delay T via end-user adjustable slider 604 for all windows in an operating system 408. In another embodiment the adjustable slider 604 may be associated with only end-user specified applications. For example, set timer delay T for any applications as part of Microsoft Office 2000 applications.

It should be understood that the process of changing state options with a cursor and a pointing device such as a mouse, glide pad, trackball, touch screen, or track point pointing device is discussed for changing one or more state options. The use of voice input for the selection of state options on a pull-down menu is also possible.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for presenting a graphical menu item on a display comprising the steps of:

receiving a time delay selected by an end-user;

presenting to the end-user a graphical menu item wherein at least one selectable menu item having a selectable option state;

receiving input from the end-user for changing the option state on at least one selectable menu item;

waiting an amount of time greater than the time delay before removing the graphical menu item from the display;

(a) determining if the end-user selected an area of the display outside an area defined by the menu item and closing the menu item if an area outside the menu item was selected; and (b) determining if the end-user did not select an area of the display outside an area defined by the menu item performing the steps of:

(I) determining if the end-user selected one or more option states on the menu item and if the end-user selected one or more option states, setting a time delay in a timer; testing to see if the time delay has passed and closing the menu item, and if the time delay has not passed repeating step (a) above; and (II) determining if the end-user has not selected one or more option states on the menu item and if the end-user has not selected one more option states, then performing the steps of determining:

if one or more option states were not changed then repeating step (a) above; and if one or more option states were changed then performing the sub-steps of determining:

if the time delay loaded in the timer has passed and closing the menu item; and if the time delay has passed, and if the time delay has not passed, repeating step (a) above.

2. An informational processing system, comprising a display for presenting a graphical user interface to an end-user, the graphical user interface includes at least one graphical menu item that is displayed in response to an initial selection by the end-user, with at least one menu item having a selectable options state, said information processing system comprising;

an input for receiving one or more subsequent selections from an end-user for changing the option state on at least one menu item;

a resettable timer for providing a delay as selected by the end-user between the time when the end-user changes an option state on at least one menu item input by sending the one or more subsequent selections and the time when the menu item is removed from the graphical user interface, the delay in the timer being reset after each option state is changed; and a selection monitor for:

determining if the end-user selected an 4area of the display outside an area defined by the menu item and closing the menu i;em if an area outside the menu item was selected; and determining it the end-user did not select an area of the display outside an area defined by the menu item by:

determining if the end-user selected one or more option states on the menu item and if the end-user selected one or more option states, setting a time delay in a timer; testing to see if the time delay has passed and closing the menu item, and if the time delay has not passed, determining if the end-uses selected an area of the display outside an area defined by the menu item and closing the menu item if an area outside the menu item was selected; and determining if the end-user has not selected one or more option states on the menu item and if the end-user has not selected one more option states, then determining if one or more option states were not changed then, determining if the end-user selected an area of the display outside an area defined by the menu item, and closing the menu item if an area outside the menu item was selected; and if one or more option states were changed then determining:

if the time delay loaded in the timer has passed and closing the menu item; and if the time delay has passed, and if the time delay has not passed, determining if the end-user selected an area of the display outside an area defined by the menu item and closing the menu item if an area outside the menu item was selected.

3. The information processing system of claim 2, wherein the input is a voice input.

4. A computer readable medium comprising programming instructions for presenting a graphical menu item on a display, the programming steps comprising:

receiving a time delay selected by an end-user;

presenting to the end-user a graphical menu item wherein at least one menu item having a selectable option state;

receiving input from the end-user for changing the option state on at least one menu item;

waiting an amount of time greater than the time delay before removing the graphical menu item from the display;

(a) determining if the end-user selected an area of the display outside an area defined by the menu item and closing the menu item if an area outside the menu item was selected; and (b) determining if the end-user did not select an area of the display outside an area defined by the menu item performing the steps of:

(l) determining if the end-user selected one or more option states on the menu item and if the end-user selected one or more option states, setting a time delay in a timer; testing to see if the time delay has passed and closing the menu item, and if the time delay has not passed repeating step (a) above; and (II) determining if the end-user has not selected one or more option states on the menu item and If the end-user has not selected one more option states, then performing the steps of determining:

if one or more option states were not changed then repeating step (a) above; and if one or more option states were changed then performing the sub-steps of determining:

if the time delay loaded in the timer has passed and closing the menu item; and if the time delay has passed, and if the time delay has not passed, repeating step (a) above.

5. The computer readable medium according to claim 4, wherein the programing instruction of receiving input from the end-user for changing the option state includes changing the option state using the end-user's voice.

* * * * *